Aug. 28, 1951  L. B. RYLAND  2,565,886
PREPARATION OF SILICA-ALUMINA CRACKING CATALYST
Filed July 24, 1950
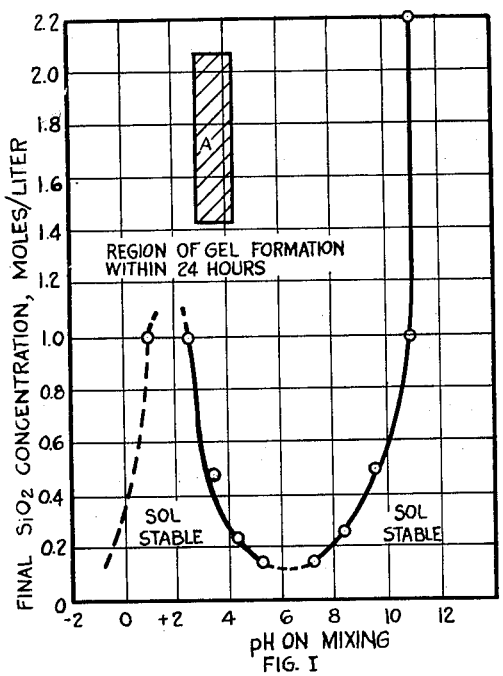
FIG. I
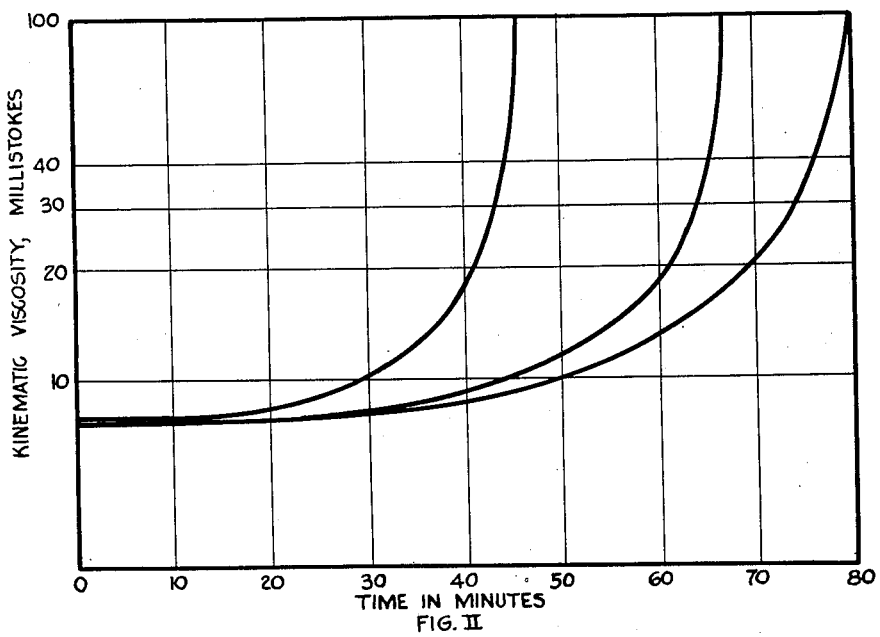
FIG. II
Inventor: Lloyd B. Ryland
By His Attorney:

Patented Aug. 28, 1951

2,565,886

UNITED STATES PATENT OFFICE 2,565,886

PREPARATION OF SILICA-ALUMINA CRACKING CATALYST

Lloyd B. Ryland, El Cerrito, Calif., assignor to Shell Development Company, San Francisco, Calif., a corporation of Delaware Application July 24, 1950, Serial No. 175,528

7 Claims. (Cl. 252—453)

This invention relates to a process for the production of silica-alumina cracking catalyst.

The object of the invention is to provide a method for the production of superior synthetic silica-alumina cracking catalyst which is applicable for the production of such catalysts on a commercial scale.

The process in the petroleum industry known as catalytic cracking is in wide use on a large scale. While certain so-called natural catalysts (special acid treated clays) are used in some plants, the most commonly used catalyst is the so-called synthetic silica-alumina catalyst. When it is considered that a single catalytic cracking plant has an inventory of catalyst of several hundred tons, and uses several tons a day of fresh catalyst for make-up, it is evident that any practical catalyst must be capable of production in a simple manner on a large scale. At present the commercial synthetic silica-alumina cracking catalyst is generally made by forming a dilute slurry of hydrous silica gel by adding sulfuric acid to a solution of sodium silicate, impregnating the hydrous silica gel with aluminum sulfate, and then hydrolyzing the aluminum sulfate by the addition of ammonium hydroxide. While the catalyst and method of manufacture of the catalyst appear to be quite simple in general outline, the true nature of the catalytic action and the mechanism of the deactivation of the catalyst are very complex and little understood, and in order to produce an active and stable catalyst certain details in the method of the manufacture must be controlled. Thus the pH, time of washing, etc., are important. See U. S. Patent No. 2,478,519. The resultant catalyst which may be prepared in the form of powder, microspheroids, pellets, or larger granular fragments, is quite active and quite stable against the detrimental influences of high temperature and steam.

A lengthy and detailed study of the fundamental aspects of this type of catalyst has been made. This work brought to light many important facts regarding the physical structure, types of combinations of the silica and alumina, mode of catalyzing the cracking of hydrocarbons, etc. For instance, it is now known that the aluminum may exist in the catalyst in any one of three forms depending upon the details in the procedure of preparation. These forms are namely, free alumina, cationic aluminum, anionic aluminum, and combinations thereof. It is now know that the cracking activity is associated with one type of silica-alumina complex. As a practical result of this study, a synthetic silica-alumina cracking catalyst was developed which is believed to be superior to synthetic silica-alumina cracking catalysts previously known. This catalyst which is described and claimed in U. S. Patent No. 2,469,314 is characterized physically: (1) by an alumina content which is above that found in the usual commercial catalysts and, namely, of the order of 18–38%; (2) by having pores which are much larger than those previously thought optimum and, namely, in the order of 50–75 Angstroms; (3) by a very low particle density, below 0.95 grams/cc.; and (4) by having associated with the above characteristics a large available surface. As pointed out in said U. S. Patent No. 2,469,314, certain details in the preparation are necessary to obtain an active and stable catalyst having these characteristics. As shown in the examples, the catalyst was prepared under exceedingly acid conditions (pH=0), through a properly aged silica gel, and through the use of aluminum chloride. While this catalyst can be produced as therein described, this can only be done at a considerable cost. This is due primarily to the facts (1) that the exceedingly acid conditions require special and costly equipment and result in a waste of large amounts of acid, (2) that enormous amounts of purified water and equipment are required to free the catalyst of alkali metal salts, (3) that under the exceedingly acid conditions used the time of set of the hydrogel is very long, therefore requiring very large vessels to afford the necessary residence time, and (4) that aluminum chloride is much more costly than aluminum sulfate. Consequently, it was later attempted to modify that method of preparation to lower the cost to a more economical level, but these attempts failed to produce a catalyst having material superiority over the synthetic silica-alumina catalyst presently in commercial use.

A method has now been developed whereby a catalyst similar to that of U. S. Patent No. 2,469,314 and even somewhat more active can be produced more economically. As will be seen from U. S. Patent No. 2,469,314 the base gel of the described superior catalyst was prepared under highly acid conditions (pH=0).

According to the method of this invention the base material is now produced under less acid conditions; the pH is between 2.8 and 4.1 and preferably about 3.5. The trick here is to use very concentrated solutions. Thus, whereas it is the usual practice to produce silica hydrogels having a concentration of $SiO_2$ between about 3 and 6%, it is necessary to employ silica sols of such concentrations that the concentration of SiO₂ is at least 8.5% and preferably at least about 9.3%. The use of silica sols having such concentrations of silica would ordinarily not be practical in plant practice. In the method of the invention the sol is diluted in a particular manner with water during the polymerization. This dilution and the manner in which it is carried out have an important influence on the character and properties of the catalyst. With the base material produced in this manner it is possible to incorporate the desired large amount of alumina, and have it all combine with the silica in the desired particular manner to produce a catalyst having the desired properties and the high desired activity. Also, the catalyst produced in this manner can be washed free of soluble salts in conventional plant equipment with reasonable amounts of wash water. It is also possible, using this procedure, to employ aluminum sulfate instead of aluminum chloride.

Having set forth the background and the general statements of the present method, the method for preparing the catalyst will be described in more detail.

FORMATION OF THE SILICA SOL

A concentrated silica sol is first produced under acid conditions. The concentration of silica in the sol is at least 85 grams per liter and preferably 90 to 125 grams per liter. This sol may be produced by either adding the sodium silicate solution to the acid with mixing, or by simultaneously pumping the sodium silicate solution and the acid into an acid medium with mixing. In the first method the sodium silicate solution is added until the pH of the sol is between 2.8 and 4.1 and preferably about 3.5. In the second case, the rates of flow of sodium silicate and acid are adjusted to give a pH of the mixture of 2 to 3 and preferably about 2.8, and then the sol is adjusted to a pH between 2.8 and 4.1 by the addition of a small "trimming" amount of alkali, e. g. sodium silicate.

As an example of the first case, E Brand sodium silicate (Philadelphia Quartz Company) is diluted to 1.28 N (as to Na⁺) and 3.2 volumes of the solution are added with stirring to 1 volume 4.1 N sulfuric acid. (All volumes refer to the volume of acid as basis.) This gives a sol of pH 3.5 containing 93 grams SiO₂ per liter.

As an example of the second case, E Brand sodium silicate is diluted to 2.06 N and 1.95 volumes of the solution are added simultaneously with 1 volume of 4.07 N H₂SO₄ to 1.2 volumes of water, after which the pH is adjusted from 2.5 up to 3.5 by the addition of a small amount of the sodium silicate solution.

The preferred acid is sulfuric acid. However, nitric acid or hydrochloric acid can be used. In the reaction of the sodium silicate with the acid to produce the sol a large amount of alkali metal salt, e. g. sodium sulfate, is formed. This salt exerts a considerable dehydrating action, particularly in the concentrated sol, and plays a role in determining the properties of the catalyst. For this as well as other reasons a sodium silicate having a lower alkali-silica ratio than the orthosilicate or metasilicate is preferred. Thus, sodium silicate solutions having an alkali-silica ratio between about 1:2.5 and 1:3.9 are preferred. The sodium silicates known as "E" Brand, "N" Brand and "S" Brand (Philadelphia Quartz Company) are well suited. The "E" and "N" Brands have an alkali-silica ratio of about 1:3.22 and the "S" Brand has an alkali-silica ratio of about 1:3.90.

When mixing the acid and the sodium silicate there is a tendency to precipitate silicic acid, and this tendency is particularly pronounced when preparing a sol of the high concentration specified. The formation of a small amount of precipitate is not particularly harmful. The formation of a precipitate is minimized (1) by adequate mixing, (2) by using an acid solution which is stronger than the sodium silicate solution, and (3) by maintaining the pH at the stated low value during the mixing. While it is preferred to regulate the conditions so as to form the clear sol, the invention does not preclude the presence of such gelatinous precipitate.

AGING OF THE SOL

The silica sol produced as specified will upon standing gradually thicken and finally set to a hard gel. The time of set is determined as follows. A 75 cc. portion of the fresh sol is poured into a 100 cc. beaker. A 3 mm. glass rod 8 cm. long and pointed at one end is placed in the sol with the point resting on the bottom of the beaker. The rod is allowed to fall from an initial angle of 15° from the vertical to an angle of 30°. The point when the rod is held between these angles is the setting point and the time interval between this point and the formation of the sol is the time of set (T'). The time of set for a number of sols and conditions is given by Hurd (Journ. Phys. Chem. 37 321 (1938)). The time of set is dependent upon the various factors, including the concentration of silica, the concentration of alkali metal salt, and the pH of the sol. The region of conditions of concentration of SiO₂ and pH where setting occurs within 24 hours with sols made from sodium silicate having an alkali-silica ratio of 1:3.9 is shown in the graph Fig. I of the attached drawing. The rectangle A near the top of Fig. I delineates the conditions under which the sol is formed according to the method of this invention.

If the sol is allowed to stand it does not set at once to a gel but the setting is preceded by a gradual increase in the viscosity. The rate of this increase in viscosity is dependent upon the conditions and is a function of the time of set. Typical rates of increase of the viscosity for sols having different times of set are shown in the graph, Fig. II of the attached drawing. It is found, however, that if the "reduced time of set" (T/T') (i. e. the actual time divided by the time of set) is used in plotting the viscosity curves, the curves substantially coincide. The increase in the viscosity of the sol is due to the growth of the colloidal silica micellae and is a function of the extent of aging of the sol. The aging of the sol is of importance in determining the activity and stability of the catalyst.

In the method of the invention the sol is preferably one which if allowed to stand would set to a gel in about 10 minutes to 90 minutes and more preferably in about 15 minutes to 40 minutes. The sol could be allowed to gel and the gel could then be further aged by standing. This, however, does not yield a catalyst having the desired properties. In the method of the invention the sol is not allowed to set and the aging is carried out in a different manner. At a time short of T' the increase in the viscosity is halted, the aging rate is reduced, and setting is prevented by diluting the sol with water. In other words, at a certain point short of setting the polycondensation to a rigid gel is arrested by dilution while allowing the silica micellae to further age under acid conditions.

DILUTION OF THE SOL

The dilution of the sol is preferably begun late in the aging period, e. g. where the "reduced time of set" (T/T') is between 0.5 and 0.95 and preferably as near to 0.95 T/T' as practically feasible. The preferred method is to begin the dilution as soon as the viscosity corresponds to that of the chosen value of T/T' and to continue the dilution at a rate to maintain the viscosity substantially constant. The amount of water required will vary somewhat depending upon the concentration of silica in the sol and the pH; in a typical case it is 2.25 volumes.

The addition of the water may be controlled in response to a continuous viscosity measurement of the sol, using one of the known techniques, and this addition may be automatically controlled. One suitable method for controlling the addition of the water is through the use of a consistency controller, e. g. such as used on paper stock, which measures the torque required to rotate a paddle or other mixer at a constant speed. This measurement may be accomplished by means of a controlling ammeter or by any mechanical method of torque measurement. For control, the torque indications may be transmitted mechanically or electrically to a dilution valve and so control the dilution rate as to maintain a substantially constant consistency.

As will be seen from the graph in Fig. II the rate of increase of viscosity becomes very high as the setting time is approached. Consequently, the actual viscosity maintained by the dilution may vary considerably without appreciably varying the time factor. Merely by way of example, however, the viscosity may be held at substantially 20, 50 or 100 poises. The dilution extends over a substantial period, e. g. 30 minutes to 2½ hours, depending upon the viscosity chosen and other factors. During this period the rate of addition of water is high at first and gradually diminishes as the rate of aging decreases. The step can be considered completed when the rate of water addition becomes negligible. During the dilution the pH increases only slightly; in a typical case the pH at the end of the dilution is 4.1. The amount of water used is preferably the minimum which will retain the chosen viscosity.

FURTHER AGING

In the aging of the sol and the subsequent dilution step the silica micellae are aged under strong acid conditions at the maximum concentration while preventing the polycondensation reaction proceeding so far that a rigid hydrogel is formed. In the next step the material is given a short aging treatment under approximately neutral conditions while again preventing setting to a gel. This is accomplished by bringing the pH to about 7, e. g. 6.0 to 7.0, while adding a further quantity of water. The amount of alkali required is very small, e. g. 0.06 volumes of 2.9 normal NH4OH. The amount of water required will again vary with the pH before the addition of the alkali, the concentration of silica and the viscosity chosen. In a typical case, for example, the amount of water is about 4–5 volumes. As in the previous dilution the rate of addition of the water is adjusted to maintain the viscosity (consistency) at an approximately constant value. At least a part of the water is preferably added with the alkali, e. g. to produce a very dilute ammonium hydroxide solution. Sodium hydroxide or trona may be substituted for ammonium hydroxide.

Only a very short time at a pH of about 7 is required and the time factor at this point is not critical. Thus the re-acidification of the silica by the addition of aluminum sulfate may take place immediately after bringing the pH to about 7, or any reasonable period of time may elapse. In practice, the material may remain at a pH of 7 for about 5 minutes to an hour, for example.

ADDITION OF THE ALUMINUM

After bringing the silica to a pH of about 7 as described, a solution of aluminum sulfate is added. This immediately reduces the pH to about 3 and materially reduces the viscosity. The quantity of aluminum sulfate solution added is adjusted to give between 18% and 30% of $Al_2O_3$ in the finished catalyst (dry basis).

In carrying out the preparation of the improved catalyst it is preferred to use an aluminum sulfate solution of high concentration. To this end it is desirable to use a substantially saturated solution, e. g. 1 molar aluminum sulfate. Aluminum chloride and aluminum nitrate are also suitable but are much more costly than aluminum sulfate.

HYDROLYSIS OF THE ALUMINUM SULFATE

No appreciable reaction is believed to take place between the aluminum sulfate and the silica in the above step but other physical changes may take place. The reaction takes place during the hydrolysis step. The hydrolysis is carried out by the relatively slow addition of a basic precipitant such as ammonium hydroxide. The final pH in this step is between about 5 and 7. When incorporating about 25% alumina this requires about 2.5 volumes of 2.9 normal ammonium hydroxide. The addition of the ammonium hydroxide is preferably begun shortly after adding the aluminum sulfate and is preferably completed within about two hours of this time. The time factor at this point is not exceedingly important. Other basic precipitants such as trona, ammonium carbonate, ammonium hydrosulfide, may be employed if desired.

During the hydrolysis, which is preferably carried out by adding the ammonium hydroxide at a relatively slow even rate (e. g. during 20 minutes) with good mixing, an intermediate hydrolysis product reacts with the silica to produce a slurry of the desired silica-alumina complex. When the catalyst is prepared in the manner described the desired large concentration of aluminum (e. g. 25% $Al_2O_3$) may be incorporated and combined with the silica in the desired manner. It is indeed possible in any of the older methods to physically incorporate any desired large concentration of aluminum, but at the expense of a decreased catalytic activity since free alumina, which acts as a diluent, is formed in the resulting catalysts. By the method of the invention just described it is possible to incorporate larger quantities of aluminum in the particular complex form desired and the catalyst contains no free alumina.

REMOVAL OF ALKALI METAL IMPURITIES

The wet catalyst at this stage contains considerable amounts of soluble salts. These salts, due to the method used, are present in a relatively high concentration and their presence up to this stage is desirable. As previously pointed out, these salts exert an appreciable dehydrating effect which tends to increase the effective concentrations of the aluminum sulfate. However, sodium salts are known to exert a detrimental effect on the finished catalyst. There is some indication that small amounts of sodium have less detrimental effect in the present catalyst than in previous catalysts.

There are several applicable methods for substantially completely removing sodium salts. In most cases it is sufficient to simply wash the undried material with water which may be either condensate water or water freed of harmful salts by treatment with a base exchange resin. Alternatively, the material may be first washed to remove the bulk of the soluble salts and then washed with a dilute acid, e. g. hydrochloric acid, hydrofluoric acid, acetic acid. Alternatively, the material may be given a final treatment with an acidic polyvalent metal salt solution, e. g. a solution of aluminum chloride, aluminum nitrate, or aluminum sulfate. Another treatment which is very effective in removing sodium is treatments with a solution of an ammonium salt, e. g. ammonium chloride, ammonium nitrate, ammonium sulfate, ammonium acetate. While ammonium acetate is very effective care must be exercised in its use since it tends to modify the pore structure. These treatments may be applied to the filter cake obtained at this step of the process or they may be applied after the filter cake has been partially dried. It is preferred to separate the catalyst from the mother liquor by sedimentation-decantation and to wash out the sodium salts prior to drying.

DRYING

After removing the sodium salts the material is dried. This step is carried out in the conventional manner while observing the usual precautions. It is preferred to pre-dry the material relatively rapidly but yet under relatively mild conditions. One suitable method is to pass the material in a thin layer through a drying oven held at between about 80° C and 130° C while passing a stream of air to remove the evolved water vapor. Drying to a water content of about 15% is desirable. This material may then be dried to a lower water content, e. g. 2–5%, by ordinary calcination at a higher temperature.

In an alternative method the material, before or after removing the sodium salts, may be made into a thin slurry which is passed through a colloid mill and then spray dried to form microspheres.

In another alternative method the material, preferably after removing the sodium salts, may be made into a thick paste which is mulled until it assumes a tacky consistency, then allowed to age and then finally extruded into pellets which are dried in the conventional way.

TEMPERATURE CONTROL

It is well-known that temperature has an influence on such factors as gelation time, catalyst density, etc., and it is known how differences in temperature can be compensated for when that is necessary. The described method of catalyst preparation has been developed using normal ambient temperatures of approximately 70° F. Any abnormal deviation from these conditions can be therefore corrected either by heating or refrigeration, or by slight adjustment of the other conditions in the known manner.

The present method does not require either refrigeration or heating. However, both refrigeration and heating can be used to advantage if their use can be economically justified. Thus by cooling the sulfuric acid and/or the sodium silicate solution to below room temperature it is possible to produce even more concentrated sols. Also, by heating the aluminum sulfate solution it is possible to use an even more concentrated solution, e. g. 2 molar.

The reasons accounting for the improvements in catalytic properties effected by the described method of preparation cannot be fully explained. As previously explained, one of the properties desired in the catalyst is a low particle density. It is to be emphasized, however, that this property by itself is not responsible for the noted improvement. It is well-known that the density of silica-alumina catalysts can be made low by any one of several methods. For instance, one method is to treat the material with hot water for periods ranging from one to several days. Another method is to treat the material with dilute ammonium hydroxide. Simple aging under alkaline conditions also produces a material of lower-than-usual density. However, these methods, although producing catalysts of low density, do not afford a catalyst having the superior properties of the catalyst in question. In fact it is well-known that in general the activity of silica-alumina catalysts decrease with decreasing density. This is due not only to the lesser weight of catalyst occupying the reactor space but also to the fact that in xerogel catalysts the available surface decreases markedly with decreasing density. It will be noted that the catalysts prepared as presently described have a high surface compared to what might be expected from a low density material, but that the surface is slightly less if anything than the conventional catalysts having densities of the order 1.1 (usually considered optimum). If the specific activity (activity per unit of available surface) is considered, however, it is found that the present catalyst, like that described in U. S. Patent No. 2,469,314, has a much higher intrinsic activity. It is evident therefore that when preparing the catalyst in the described manner the aluminum and silica are combined in such a manner as to afford a greater number of active sites per unit of surface. This result is obtained by bringing the silica to just the proper state for reaction with the hydrolyzing aluminum sulfate. This state is obtained by forming a very concentrated silica sol under acid conditions, allowing the silica sol to partly polymerize under controlled acid conditions, then diluting the sol at a point where T/T' approaches unity, and finally raising the pH for a short period up to approximately 7. It will be noted that up through the point of adding the aluminum sulfate the maximum concentration of silica is maintained without at any point allowing the material to set to a rigid gel. The use of less concentrated basic silica hydrogel slurries is, of course, common practice but such slurries even when alkaline give a more dense and less active high alumina catalyst. The preparation of the base gel under acid conditions likewise does not in itself afford the desired properties except when carried out as described in U. S. Patent No. 2,469,314 where a very concentrated pH=0 sol having an exceedingly long gel time is used. Thus, by way of example when two volumes of diluted sodium silicate solution (1.251 sp. gr.) are added to one volume of 26%

H₂SO₄ with stirring a clear sol is produced which sets to a firm gel in about 2½ hours. However, after washing and drying, the material has a density of over 1.2. The incorporation of alumina by the usual method further increases the density. Also, if equal volumes of the sodium silicate and sulfuric acid are used the material still has a density above 1.1.

EXAMPLES

In the following examples the catalysts were tested through use for the catalytic cracking of a typical West Texas gas oil having the following properties:

| | |
|---|---|
| Gravity, ° A. P. I. | 30.7 |
| A. S. T. M. boiling range, ° C. | 260–369 |
| Aniline point | 70.2 |
| $N_a^{20}$ | 1.4849 |
| $D_4^{20}$ (vac.) | 0.8689 |
| Bromine number | 6 |
| Carbon, per cent weight | 85.65 |
| Hydrogen, do | 12.86 |
| Sulfur, do | 1.36 |
| Nitrogen, do | 0.10 |

The cracking runs were made under a standardized fixed bed test procedure using 50 cc. of the catalyst (6–4 mesh granules) under the following conditions:

| | |
|---|---|
| Temperature, ° C. | 565 |
| Liquid hourly space velocity | 4 |
| Pressure | Atmospheric |
| Process period | 1 hour |
| Diluent | None |

The catalysts were tested in the fresh condition and also after being subjected to artificial aging by treating them with steam for 24 hours at 565° C. and 1 atmosphere pressure.

In the application of cracking catalysts it is the practice to contact the hydrocarbon oil under cracking conditions with the catalyst in the form of finely divided particles, or in the form of granules, or pellets, or cast pieces. The catalyst particles quickly become fouled with tarry materials and are usually regenerated first by steaming to remove easily volatilizable material and then by burning the less volatilizable residue. It has been observed that when used in such processes the activity of the catalyst declines most rapidly during the early period of use and thus generally levels out over an extended period of use. The rapid initial loss of activity is largely caused by the stripping steam. Relatively dry heating such as occurs in the forming process has very little damaging effect unless the temperatures are allowed to greatly exceed the normal values of about 1050–1150° F. Therefore, in order to measure the stability of a catalyst it is common practice to subject the catalyst to an accelerated steaming treatment which simulates the treatment to which the catalyst is subjected during a period of use. It has been found that a catalyst which declines only moderately under the mentioned steaming treatment holds up well in commercial use and allows a relatively high "equilibrium activity" to be retained with a small catalyst replacement rate, whereas a catalyst which is badly damaged by such steam treatment affords a lower equilibrium activity at the same replacement rate.

For the purpose of comparison the catalyst described in U. S. Patent No. 2,469,314 may be used. As pointed out in said patent the superior catalyst therein described and claimed, when tested under the same conditions, was 116% as active on an equal weight basis as a standard catalyst. Also, as shown, upon steaming at 565° C. for 24 hours the catalyst declined to approximately 83% activity, whereas comparison catalysts declined on the same treatment to 48% and 45% activity on the same basis.

Example I

A catalyst was prepared as follows: Philadelphia Quartz Company E-brand sodium silicate (4.17 N, 401 g. SiO₂/L) was diluted to 1.28 normal (as to Na⁺) and 3.2 volumes of the solution were slowly added to 1 volume of 4.1 normal sulfuric acid with stirring. This produced a clear sol having a pH of about 3.5 and containing about 93 grams SiO₂ per liter. After allowing the sol to age for approximately 61 minutes (T/T′=approximately 0.8) a total of 2.25 volumes of water were added with stirring over a period of about 77 minutes at a rate to maintain the viscosity substantially constant. This resulted in increasing the pH to about 4.1. The pH was then increased to 7.0 by the slow addition (about 10 minutes) of about 0.06 volumes of 2.9 normal ammonium hydroxide while the viscosity was again held substantially constant by the addition of approximately 4 volumes of water. After a period of about 12 minutes, sufficient 1 molar aluminum sulfate solution was added to supply about 22% Al₂O₃ on the dry basis. This resulted in decreasing the pH to about 3.0 and in reducing the viscosity sharply. Then the aluminum sulfate was hydrolyzed by slowly adding 2.9 normal ammonium hydroixde until the pH was about 7 (about 2.5 volumes). The material was then filtered and the wet catalyst was washed with water until the wash water was free of sulfate. The washed alumina-silica complex was dried at 90° C. and then calcined for 6 hours at 565° C. in a stream of dry air. The physical properties of the catalyst are compared with those of the catalyst of Example II of U. S. Patent No. 2,469,314 in the following table:

| | Example I | Comparison |
|---|---|---|
| Analysis, per cent by weight: | | |
| Na₂O | 0.17 | 0.03 |
| Al₂O₃ | 22.0 | 24.2 |
| SO₄ | 0.09 | <0.05 |
| Particle density, g./cc. | 0.92–.95 | 0.89 |
| Specific surface, m.²/g. | 497 | 493 |
| Average pore diameter, Å | 51 | 56 |

Both catalysts were tested fresh and after steaming for 24 hours at 565° C. The results are shown in the following table:

| | Example I | | Comparison | |
|---|---|---|---|---|
| | Fresh | Steamed | Fresh | Steamed |
| Per cent cracked [1] | 49.3 | 42.4 | 43.8 | 38.5 |
| Per cent converted to 50–200° C. fraction | 22.4 | 20.5 | 19.7 | 19.0 |
| Activity [2] | 132 | 87 | 116 | 83 |

[1] In all cases "per cent cracked" means 100 minus the per cent by weight of recovered oil of the same boiling range as the feed.
[2] In all cases "activity" means the activity per unit weight of catalyst compared to the same standard as used in U. S. Patent No. 2,469,314 (catalyst A).

It will be noted that the physical properties of the two catalysts are substantially the same except that the catalyst of Example I contains somewhat more sodium than would be desired. The sodium content can, however, easily be reduced by further washing or by one of the methods described above. It will be noted that the catalyst prepared by the new method is more active both initially and after being subjected to the relatively drastic steaming treatment. This is an important advantage. However, of even more importance is the fact that the catalyst can be produced much more cheaply by the new method. Little acid is uselessly consumed; no long aging or treating period requiring large acid resistant agitators are involved; a rigid hydrogel is avoided; the catalyst can be washed either by sedimentation and decantation, or by filtering with washing on the filters, or by repulping; refrigeration or heating, while they can be advantageously used, are unnecessary.

*Example II*

A catalyst was prepared essentially as described in Example I except that the material after drying at 90° C. was treated with an aqueous solution of ammonium acetate to decrease the content of $Na_2O$ to less than 0.01%. The particle density of the catalyst was 0.94 g./cc. The results obtained on testing this catalyst before and after steaming are shown in the following table:

|  | Example II | | Comparison | |
| --- | --- | --- | --- | --- |
|  | Fresh | Steamed | Fresh | Steamed |
| Per cent by weight cracked | 50.5 | 42.2 | 43.8 | 38.5 |
| Per cent by weight 50–200° C. fraction | 22.5 | 20.4 | 19.7 | 19.0 |
| Activity | 135 | 83 | 116 | 83 |

It will be noted that, contrary to what would be expected on the basis of prior experience with silica-alumina cracking catalyst, the 0.17% $Na_2O$ in the incompletely washed catalyst of Example I had very little, if any, detrimental effect.

*Example III*

A catalyst was prepared essentially as described in Example I, except that the pH of the sol was adjusted to 3.91 instead of 3.5. The resulting sol therefore aged more rapidly under slightly less acid conditions. The dilution with water was therefore begun about 24 minutes after forming the sol (T/T'=about 0.8).

The physical properties and the results of testing the catalyst are given in the following table:

|  | Example III | | Comparison | |
| --- | --- | --- | --- | --- |
|  | Fresh | Steamed | Fresh | Steamed |
| Analysis: | | | | |
| $Na_2O$ | 0.15 | | 0.03 | |
| $Al_2O_3$ | 22.3 | | 24.2 | |
| $SO_4$ | 0.05 | | <0.05 | |
| Particle density, g./cc. | 0.88 | | 0.89 | |
| Specific surface, m.²/g | 505 | | 493 | |
| Average pore diameter, Å | 56 | | 56 | |
| Per cent by weight cracked | 48.6 | 40.6 | 43.8 | 38.5 |
| Per cent by weight 50–200° C. fraction | 22.4 | 19.7 | 19.7 | 19.0 |
| Activity | 130 | 83 | 116 | 83 |

*Example IV*

A catalyst was prepared essentially as described in Example I, except that in hydrolyzing the aluminum sulfate the final pH was brought to 6.4 instead of 7. The properties and results of testing the catalyst are given in the following table:

|  | Example IV | | Comparison | |
| --- | --- | --- | --- | --- |
|  | Fresh | Steamed | Fresh | Steamed |
| Analysis: | | | | |
| $Na_2O$ | 0.01 | | 0.03 | |
| $Al_2O_3$ | 24.1 | | 24.2 | |
| $SO_4$ | 0.05 | | <0.05 | |
| Particle density, g./cc. | 0.92 | | 0.89 | |
| Specific surface, m.²/g | 506 | | 493 | |
| Average pore diameter, Å | 51 | | 56 | |
| Per cent by weight cracked | 48.9 | 40.7 | 43.8 | 38.5 |
| Per cent by weight 50–200° C. fraction | 22.5 | 19.7 | 19.7 | 19.0 |
| Activity | 130 | 80 | 116 | 83 |

*Example V*

A catalyst was prepared as follows: Philadelpha Quartz Company E-Brand sodium silicate was diluted to 2.06 normal and 1.95 volumes of the solution were added simultaneously with 1 volume of 4.07 normal sulfuric acid to 1.2 volumes of water while stirring. The solutions were added at such a rate that the pH during the formation of the sol was substantially constant at 2.5. Upon completion of the addition of the sodium silicate and sulfuric acid the pH of the resultant sol was adjusted to 3.5 by the addition of a small amount of sodium silicate solution. The resulting sol contained about 93 grams of $SiO_2$ per liter. After aging for about 46 minutes (T/T' approximately 0.8) the addition of water was begun and the remaining part of the preparation was carried out essentially as described in Example I. The properties and results of testing the catalyst are given in the following table:

|  | Example V | | Comparison | |
| --- | --- | --- | --- | --- |
|  | Fresh | Steamed | Fresh | Steamed |
| Analysis: | | | | |
| $Na_2O$ | 0.11 | | 0.03 | |
| $Al_2O_3$ | 24.1 | | 24.2 | |
| $SO_4$ | 0.06 | | <0.05 | |
| Particle density g./cc. | 0.88 | | 0.89 | |
| Specific surface m.²/g | 488 | | 493 | |
| Average pore diameter, Å | 58 | | 56 | |
| Per cent by weight cracked | 48.5 | 39.5 | 43.8 | 38.5 |
| Per cent by weight 50–200° C. fraction | 22.0 | 19.4 | 19.7 | 19.0 |
| Activity | 136 | 80 | 116 | 83 |

While the catalyst prepared by the method described is a particularly active and stable cracking catalyst and is designed to allow the maximum efficiency in catalytic cracking, it can be applied, if desired, in other processes where one or more of the reactions involved in catalytic cracking is important. For example, the catalysts prepared in the described manner are more acidic in nature than silica-alumina catalysts prepared in the usual manner and they therefore are more active for acid catalyzed reactions, e. g. isomerization, polymerization, alkylation, hydrogen transfer. The catalyst loses its high activity for such reactions more rapidly than it does its activity for C—C bond fission. The catalyst may therefore be advantageously used for catalyzing one or more of such reactions, e. g. isoforming, for a period of time and then be used for catalytic cracking with little loss of efficiency in the cracking process. Also the catalyst, after being substantially spent in catalytic cracking, may still be used advantageously for processes where only a very mild cracking is desired in connection with an acid nature, e. g. in the preparation of cracking feed stocks from heavy residues by catalytic viscosity breaking.

The invention claimed is:

1. In the preparation of a silica-alumina cracking catalyst the improvement which comprises (1) preparing a silica sol containing at least 85 grams $SiO_2$ per liter by mixing a sodium silicate solution with a sulfuric acid solution under acid conditions with a final pH between 2.8 and 4.1, (2) aging said sol at a pH in said range for a time which is at least 0.5 but less than 1 times the time of set of said sol, (3) at said time diluting the sol with water at a rate to maintain the viscosity substantially constant, (4) then increasing the pH up to about pH 7 by the addition of an alkali while adding water at a rate to maintain the viscosity substantially constant, (5) adding a concentrated solution of aluminum sulfate in an amount sufficient to provide between 18% and 30% $Al_2O_3$ on the dry basis, (6) hydrolyzing the aluminum sulfate by the addition of a basic precipitant until the pH is between 5 and 7, and (7) washing and drying the product.

2. In the preparation of a silica-alumina cracking catalyst the improvement which comprises (1) preparing a silica sol containing at least 90 grams $SiO_2$ per liter and having a pH between 2.8 and 4.1 by mixing a sodium silicate solution with a sulfuric acid solution under acid conditions, (2) aging said sol at a pH in said range for a time which is at least 0.5 but less than 1 times the time of set of said sol, (3) at said time diluting the sol with water at a rate to maintain the viscosity substantially constant, (4) then increasing the pH up to about pH 7 by the addition of an alkali while adding water at a rate to maintain the viscosity substantially constant, (5) adding a concentrated solution of aluminum sulfate in an amount sufficient to provide between 18% and 30% $Al_2O_3$ on the dry basis, (6) hydrolyzing the aluminum sulfate by the addition of a basic precipitant until the pH is between 5 and 7, and (7) washing and drying the product.

3. In the preparation of a silica-alumina cracking catalyst the improvement which comprises (1) preparing a silica sol containing at least 90 grams $SiO_2$ per liter by mixing a sodium silicate solution with a sulfuric acid solution under acid conditions and adjusting the pH of the sol to about 3.5, (2) aging said sol at said pH for a time which is at least 0.5 but less than 1 times the time of set of said sol, (3) at said time diluting the sol with water at a rate to maintain the viscosity substantially constant, (4) then increasing the pH up to about pH 7 by the addition of an alkali while adding water at a rate to maintain the viscosity substantially constant, (5) adding a concentrated solution of aluminum sulfate in an amount sufficient to provide between 18% and 30% $Al_2O_3$ on the dry basis, (6) hydrolyzing the aluminum sulfate by the addition of a basic precipitant until the pH is between 5 and 7, and (7) washing and drying the product.

4. In the preparation of a silica-alumina cracking catalyst the improvement which comprises (1) preparing a silica sol containing at least 85 grams $SiO_2$ per liter and having a final pH between 2.8 and 4.1 by adding a sodium silicate solution with stirring to a sulfuric acid solution, (2) aging said sol at said pH for a time which is at least 0.5 but less than 1 times the time of set of said sol, (3) at said time diluting the sol with water at a rate to maintain the viscosity substantially constant, (4) then increasing the pH up to about pH 7 by the addition of an alkali while adding water at a rate to maintain the viscosity substantially constant, (5) adding a concentrated solution of aluminum sulfate in an amount sufficient to provide between 18% and 30% $Al_2O_3$ on the dry basis, (6) hydrolyzing the aluminum sulfate by the addition of a basic precipitant until the pH is between 5 and 7, and (7) washing and drying the product.

5. In the preparation of a silica-alumina cracking catalyst the improvement which comprises (1) preparing a silica sol containing at least 85 grams $SiO_2$ per liter by simultaneously adding with mixing a sodium silicate solution and a sulfuric acid solution into an acid aqueous medium and then adjusting the pH of the mixture to about 3.5 by the addition of a small amount of an alkali, (2) aging said sol at said pH for a time which is at least 0.5 but less than 1 times the time of set of said sol, (3) at said time diluting the sol with water at a rate to maintain the viscosity substantially constant, (4) then increasing the pH up to about pH 7 by the addition of an alkali while adding water at a rate to maintain the viscosity substantially constant, (5) adding a concentrated solution of aluminum sulfate in an amount sufficient to provide between 18% and 30% $Al_2O_3$ on the dry basis, (6) hydrolyzing the aluminum sulfate by the addition of a basic precipitant until the pH is between 5 and 7, and (7) washing and drying the product.

6. Process according to claim 1 in which the aluminum sulfate solution is at least 1 molar and is added in an amount sufficient to provide about 25% $Al_2O_3$ on the dry basis substantially immediately after increasing the pH up to about pH 7 in step 4.

7. Process according to claim 1 in which the dilution of the sol with water in step 3 is begun at a time T where the ratio of $T/T'$ approaches 0.95, where $T'$ is the time of set of the sol.

LLOYD B. RYLAND.

No references cited.